United States Patent [19]

Weinhold

[11] Patent Number: 4,555,131
[45] Date of Patent: Nov. 26, 1985

[54] COUPLING FOR CONNECTING HOSE OR PIPE ENDS

[76] Inventor: Karl Weinhold, Im Jagdfeld 43, 4040 Neuss, Fed. Rep. of Germany

[21] Appl. No.: 464,264

[22] Filed: Feb. 7, 1985

[30] Foreign Application Priority Data

Feb. 6, 1982 [DE] Fed. Rep. of Germany ....... 3204048

[51] Int. Cl.$^4$ .............................................. F16L 21/08
[52] U.S. Cl. ........................................ 285/91; 285/320
[58] Field of Search ........................... 285/91, 320, 308

[56] References Cited

U.S. PATENT DOCUMENTS

| 783,088 | 2/1905 | Vaughan | 285/91 X |
|---|---|---|---|
| 1,027,579 | 5/1912 | Wright . | |
| 2,081,571 | 5/1937 | Baade . | |
| 3,314,698 | 4/1967 | Owens . | |
| 4,037,863 | 7/1977 | Kunzle | 285/320 |
| 4,150,846 | 4/1979 | Fleischer | 285/320 X |

FOREIGN PATENT DOCUMENTS

| 545031 | 8/1957 | Canada | 285/320 |
|---|---|---|---|
| 278093 | 12/1951 | Switzerland | 285/320 |

*Primary Examiner*—Dave W. Arola
*Attorney, Agent, or Firm*—Spencer & Frank

[57] ABSTRACT

A coupling for connecting hose or pipe ends has a sleeve portion and a cylindric insert portion, each to be secured to one of the ends to be connected. The insert portion, when "plugged" in the sleeve portion, sealingly engages same to provide the coupling. The invention couples the two parts to prevent axial displacement of same. It utilizes a locking lever pivotable about a transverse axis and having a locking bolt at a location between the pivot and the free end of the lever. The pivot of the lever is mounted on a transverse cross-piece extending between free ends of the arms of a U-shaped frame surrounding the coupling. The base of the "U" has an upwardly protruding second bolt. The arms of the "U" are each curved outwardly such that in one position, the curved section releases the halves of the coupling for becoming disconnected, while in the locked state, a section of the curved arms engages the sleeve and the insert portion at suitable recesses, to interlock same together with both bolts as referred to above. The advance in the art is in structural simplicity and ease of operation as a single lever, when locked, causes, in the disclosed embodiment, three additional locking places to become effective.

17 Claims, 4 Drawing Figures

COUPLING FOR CONNECTING HOSE OR PIPE ENDS

BACKGROUND OF THE INVENTION

The invention relates to a coupling for connecting hose or pipe ends, with a sleeve portion and an insert portion insertable in the same and sealed with respect to same, and with a pivotally mounted locking element, whose bolt engages through the sleeve portion a recess in the insert portion and locks the insert portion in the sleeve portion.

It is known in such a type of couplings to mount pivotally a number of locking elements disposed about the periphery, an so to form the locking elements that they can engage with their one end a recess of the insert portion. The other end is formed as a lever which is accessible from outside and with which the portion engaging the recess in the insert portion can be swung away from the recess, when the insert portion is to be pulled away from the sleeve portion. The pivot axis is arranged in the sleeve portion approximately in the same radial plane in which the recess of the insert portion is disposed on an established "plugged" connection. The locking element has additionally the purpose to press together the front face of the insert portion and an axial seal arranged on a ring shoulder of the sleeve portion.

The known coupling has a number of drawbacks, of which the first one resides in that a number of respective locking elements or levers must be actuated when the coupling is to be open or locked. A further drawback is to be seen in that due to the arrangement of the pivot axis and the shape of the locking element, the course of the movements of each part forming the respective bolt section of the locking element can only about the walls of the recess disposed in the insert portion in linear fashion. Thus, relatively great surface pressures occur in this region, which results in a correspondingly quick wear. The wear, in turn, leads to the development of a spacing giving rise to the rattling of the locking element and at the same time also lowers the sealing pressure effective at the axial seal.

Furthermore, it is disadvantageous in the known coupling, that securement of the locking element or lever in the locked position is relatively intricate, particularly due to the number of the locking elements to be secured.

SUMMARY OF THE INVENTION

It is an object of the present invention to provide a coupling of the type mentioned at the outset, at reduced technical cost such that only a single element must be used in producing a sufficient respective locking.

In order to solve the above problem, it is proposed according to the invention that the locking element is mounted on a yoke embracing the sleeve portion, and that the yoke is provided, in a region thereof disposed opposite the locking element, with a further bolt passing through the sleeve portion which (bolt) also interlocks, in a locked position, with a recess in the insert portion.

The coupling formed according to the invention has the advantage that by means of a single pivoted locking element, a locking between the insert portion and the sleeve portion can be effected at two mutually opposite locations of the periphery. The pivot axis of the locking element is now no longer mounted on the sleeve portion but instead is disposed on a yoke connected with the further bolt. When the locking element and the bolt associated therewith are pivoted in an at least approximately radial direction, the further bolt disposed at the opposite side is also pulled into the recess of the insert portion disposed at such opposite side.

The locking element can have, as an example, the shape of a small roll which is provided at a part of its periphery with a correspondingly formed bolt. The hand actuation of the locking element is generally simpler due to the arrangement thereof as a lever. Independent thereof, the pivot axis of the locking element can be arranged, as desired, either in axial direction or in peripheral direction.

The sealing required between the insert piece and the sleeve portion can be, in the inventive coupling, advantageously a radial seal which is, for instance, disposed in a corresponding annular sleeve of the insert portion.

A particularly practical embodiment of the invention is characterized in that the locking element is a lever extending in axial direction and that the bolt of the lever engaging at the recess in the insert portion is disposed between the pivot axis of same and the free end of the lever.

Thus, in this embodiment, the pivot axis of the locking element is no longer disposed in approximately the same radial plane as the recess in the insert portion. The pivot axis is now disposed at a predetermined axial spacing relative to such region. Thus, a smaller pivot angle between the locking position and the release position is obtained. Furthermore, it is achieved thereby that the locking element or its bolt is fixedly held in the locked position at an ever increasing strength as the operating pressure increases.

In a further arrangement of the invention, it is proposed that the bolt and the yoke be so arranged and dimensioned that on an open locking element, both bolts still engage at least a little bit in the sleeve portion. Due to such an arrangement, the locking element and the collar cannot be removed from the sleeve portion by pulling away in an axial direction.

It is further of advantage according to the invention when the pivot axis of the lever is offset at a predetermined spacing relative to the engagement region of the bolt located on the lever in the direction towards the front face of the sleeve portion, when the recesses in the insert portion are longer in axial direction than the size of the bolt in such direction, and when the locking engagement between the insert portion and the bolt is effected by providing a pull of the insert portion and the sleeve portion away from each other.

Due to the relative position beetweem the pivot axis and the engagement region of the bolt associated with the lever in the insert portion, the bolt enters on pivoting the lever into the associated recess of the insert portion, without becoming disposed in a locking engagement with the wall of the recess. As soon as the operative pressure is present, it is utilized in pressing the insert portion and the sleeve portion away from each other. Thus, the locking engagement is effected automatically.

In this connection, it is further proposed that the recesses in the insert portion be provided with at least approximately radial engagement surfaces for the bolts and that the bolts extend in at least approximately radial direction when disposed in a locked position. By doing so, it is achieved that the surfaces abutting against each other in the locked position are as large as possible so that very favourable wear resistance is achieved.

As mentioned above, the bolts themselves can be blocked by the action of the operative pressure in the locked position. However, when the conduit system coupled by the coupling is free of the pressure, the lever of the locking element can be secured against release of its locked position by means of a safety element engaging on the yoke.

While the described advantages can already be achieved when the yoke engages the sleeve portion only at one side thereof, the function of the coupling can be further improved when the yoke is supplemented, according to the present invention, by a frame surrounding fully the sleeve portion. Due to the thus enabled, at least nearly symmetrical arrangement of the yoke, considerably better wear characteristics are obtained, while it is further advantageous, according to the invention, when the frame is at least approximately U-shaped, when the further bolt is formed on the central part of the frame, when the ends of the frame shanks are connected by a cross-piece and when the lever is pivotally secured to the cross-piece.

In particular, it is further proposed that the cross-piece is formed by two clips each surrounding the respective frame end, that one end of each respective clip be bent at right angles and that the bent clip ends serve as a mounting for the lever. Thus, the structure and manufacture is considerably simplified. Furthermore, according to the invention, the other respective ends of each of the clips can also be bent at right angles and can be provided with bores for inserting safety pins. In this way, the lever of the locking element can be secured in the locked position in a very simple way.

It is further advantageous according to the invention, when the recesses in the insert portion are formed by an annular groove extending over the periphery. All of the recesses can then be produced in a single manufacturing process.

While the coupling thus far described has two mutually oppositely disposed bolts, according to the invention, additional locking regions can be provided such that the shanks of the frames pass through indentations in the sleeve portion and in the locked position also engage the recesses of the insert portion. In so doing, additional locking regions are provided which are offset relative to the respective bolts by about 90°.

Herein, the shanks of the frame can form recesses at the inner face which, in the released position of the locking element, release the removal of the insert part from the sleeve position. For this purpose, the shanks of the frame can have a correspondingly bulged shape.

BRIEF DESCRIPTION OF THE DRAWINGS

In the following, a particularly preferred embodiment of the invention will be described in greater detail with reference to the drawing. In particular.

DESCRIPTION OF THE PREFERRED EMBODIMENT

Figure 1:
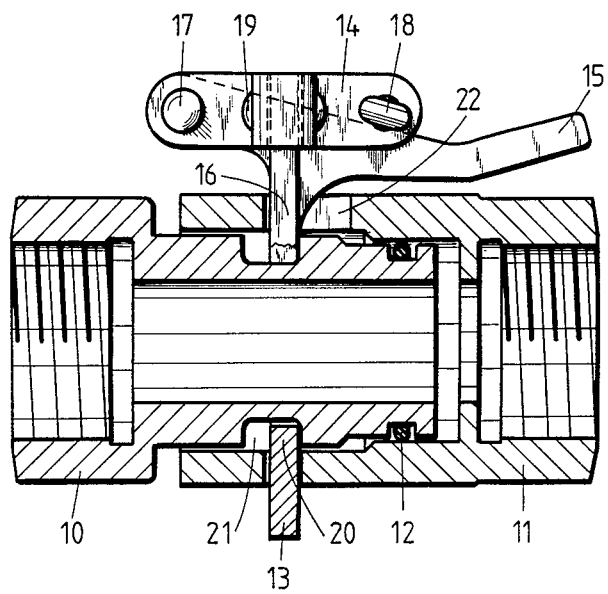
FIG. 1 is a longitudinal section of a coupling in a locked position.

The coupling has an insert portion 10 and a sleeve portion 11. Each of the portions 10 and 11 is adapted to be secured to a respective conduit i.e. hose or pipe, end. In the insert portion 10 is placed an annular seal 12 which is effective in providing the necessary sealing between the insert portion 10 and the sleeve portion.

An approximately U-shaped frame or yoke 13, having two arms and a central portion, is connected at its both ends by two clips 14. Each of the same is bent outwardly at right angles at its ends. One (pair of) said ends engage both sides of a lever 15 which forms, together with a bolt 16, (also referred to as "a first bolt") the locking element. The outwardly bent ends of the clips 14 engaging the lever 15 and the lever 15 itself are passed through by a rivet 17 forming the pivot axis for the lever 15. The rivet 17 thus forms a pivot member. The oppositely disposed bent ends of the clips 14 have each a bore in which is disposed a safety pin 18 of the type of a split pin.

The peripherally extending parts of the clips 14 form a cross-piece and surround the ends of the frame 13 with which they are connected by respective rivets 19. The central part of the frame 13 has a second bolt 20 extending inwardly in a radial direction and passing into the sleeve portion 11. The bolt 20, like the bolt 16, also engages into an annular groove 21 extending over the periphery of the insert portion 10.

The bolt 16 protrudes at a position between the rivet 17 and the free end of the lever 15 outwardly in a radial direction, through an opening 22 in the sleeve portion 11. The annular groove 21 is axially so dimensioned that it enables the pivoting inwardly of the bolt 16. The pivot axis formed by the rivet 17, of the lever 15, is offset relative to the said engagement region in the direction towards the front face of the sleeve portion 11 or in the direction towards the insert portion 10.

Figure 3:
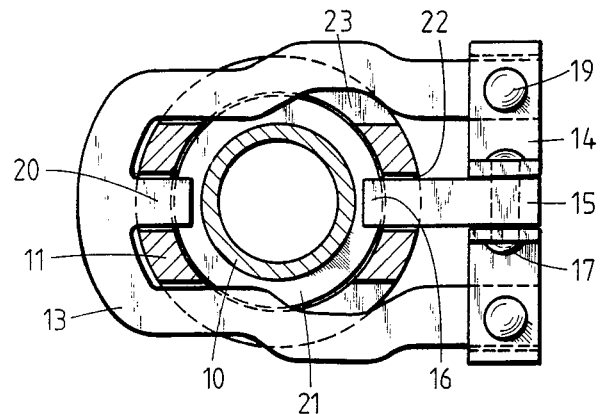
FIG. 3 is a transverse cross-section of the locked coupling of FIG. 1.
Figure 4:
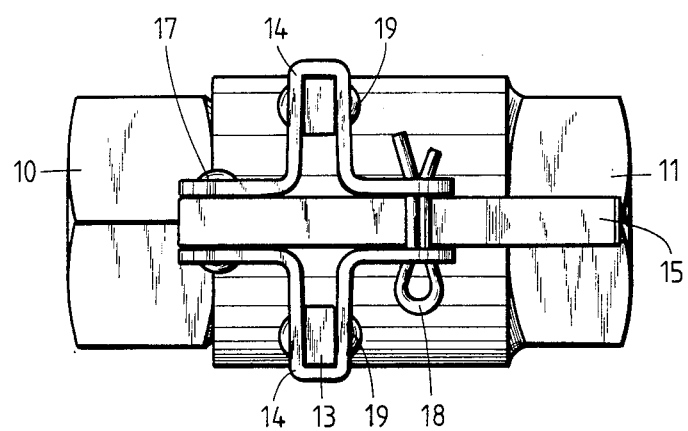
FIG. 4 is a plan view of the coupling according to FIG. 1.

The sleeve portion 11 has, at its sides facing the shanks of the frame 13, cutouts 23 through which the annular groove is accessible. The shanks of the frame 13 form, in their central region, a bulged section. This is so arranged and dimensioned that the frame 13 engages in the annular groove 21 only in the locked position as shown in FIG. 3.

Figure 2:
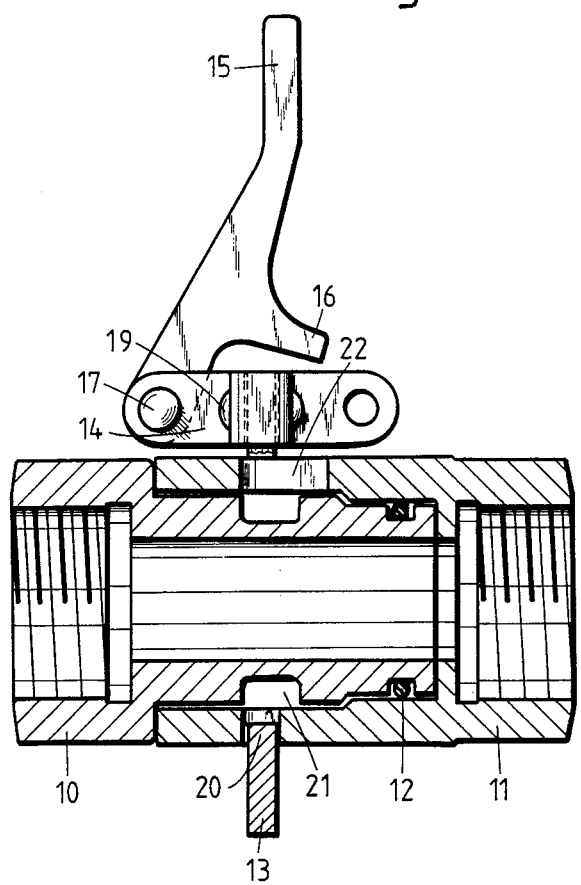
FIG. 2 is a longitudinal section of the same coupling in a released position.

In order to establish the insert connection, the insert part 10 and the sleeve part 11 are first inserted one into the other. At this point, the lever 15 is disposed at its outwardly swung position. After the insertion, the lever is pivoted in the direction towards the sleeve portion 11. In so doing, both bolts 16 and 20 are moved in a direction radially inwardly so that they engage the annular groove 21. First, the insert portion 10 and the sleeve portion 11 are disposed in a relative position shown in FIG. 2.

When the insert portion 10 and the sleeve portion 11 are further pulled by hand a bit out of each other or are forced by the arising operative pressure in a direction away from each other, the locked arrangement shown in FIG. 1 is achieved between the bolts 16 and 20 on the one hand, and the annular groove 21 on the other. As long as the operative pressure is not yet effective, the lever 15 can be held in the locked position by the safety pin 18.

After the removal of the safety pin 18, the coupling can be separated. By pivoting the lever 15 outwardly, the bolts 16 and 20 are also moved outwards, while the bulges of the frame shanks remain in the position shown in FIG. 3 and are displaced together with the frame 13 downwards so far until the engagement in the annular groove 21 is cancelled. The insert portion 10 can then be pulled out of the sleeve portion 11.

I claim:

1. A coupling for connecting conduit ends to each other, comprising in combination:
   (a) a sleeve portion having first and second opposed ends and adapted to be secured, via said first end, to a first conduit end;
   (b) a generally cylindrical insert portion having an outer periphery, said insert portion being adapted to be secured to a second conduit end, being insertable axially into said sleeve portion, and being provided with means defining at least one recess extending radially inwardly from the outer periphery of said insert portion;
   (c) sealing means carried by one of said portions for establishing a seal between said portions when said insert portion is inserted into said sleeve portion;
   (d) a yoke member surrounding, and movable relative to, said sleeve portion;
   (e) a pivotal locking element having a first bolt, and means supporting said locking element on said yoke member for pivotal movement relative to said yoke member about a pivot axis between a coupling locking position and a coupling unlocking position; and
   (f) a second bolt generally integral with said yoke member;
   (g) means on said sleeve portion engageable by said first and second bolts;
   (h) said pivotal locking member being movable into said coupling locking position for causing both said first and second bolts to engage both said means on said sleeve portion and said at least one recess at diametrically opposite locations, when said insert portion is inserted into said sleeve portion, to prevent removal of said insert portion from said sleeve portion, and said coupling unlocking position in which said first bolt is disengaged from said at least one recess and said yoke is movable to disengage said second bolt from said at least one recess to permit removal of said insert portion from said sleeve portion.

2. A coupling as claimed in claim 1, wherein the locking element includes a lever extending in an axial direction, the first bolt being disposed between the pivot axis of said locking element and a free end of the lever.

3. A coupling according to claim 2, wherein the lever is secured in said coupling locking position by means of a securement element engaging the yoke member whereby inadvertent release of the locked position is prevented.

4. A coupling according to claim 2, wherein said means defining at least one recess in the insert portion are formed by an annular groove extending about the periphery of the insert portion.

5. A coupling as claimed in claim 1, wherein the bolts and the yoke member are so arranged and dimensioned that when the locking element is in the coupling unlocking position, both said bolts still engage, at least partly, the sleeve portion.

6. A coupling according to claim 5, wherein the lever is secured in said coupling locking position by means of a securement element engaging the yoke member whereby inadvertent release of the locked position is prevented.

7. A coupling according to claim 5, wherein said means defining at least one recess in the insert portion are formed by an annular groove extending about the periphery of the insert portion.

8. A coupling according to claim 1, wherein the pivot axis of said locking element is offset by a predetermined spacing with respect to an engagement region of the first bolt towards said second end of said sleeve portion, said at least one recess in the insert portion being longer in axial direction than the size of the bolts in such direction, whereby the locking engagement between the insert portion and the bolts is effected by a force pulling apart the insert portion from the sleeve portion.

9. A coupling according to claim 8, wherein said at least one recess of the insert portion includes an at least approximately radial engagement surface for the respective bolt and the bolts extend in at least an approximately radial direction when disposed in said coupling locking position.

10. A coupling according to claim 8, wherein the lever is secured in said coupling locking position by means of a securement element engaging the yoke member whereby inadvertent release of the locked position is prevented.

11. A coupling according to claim 1, wherein said yoke member is formed to fully surround the sleeve portion.

12. A coupling according to claim 11, wherein: said yoke member comprises a generally U-shaped frame composed of a central portion and two shanks, each said shank having a first end connected to a respective end of said central portion and a second end constituting a free end; said second bolt is formed at said central portion; and said yoke member further comprises a cross-piece connecting together said free ends of said shanks and carrying said locking element.

13. A coupling according to claim 11, wherein: said sleeve portion has a cylindrical wall surrounding a region into which said insert portion is inserted, said cylindrical wall having two generally diametrically opposed recesses extending through said wall and located to be at least partially aligned with said at least one recess of said insert portion when said insert portion is inserted into said sleeve portion; and said yoke member comprises a generally U-shaped frame member including two generally parallel frame member arms shaped and dimensioned such that when said locking element is in said coupling locking position a portion of each said arm engages in a respective recess of said sleeve portion and said at least one recess of said insert portion, whereby said arm portions are operative as supplemental bolt means locking said insert portion in said sleeve portion.

14. A coupling according to claim 13 wherein said frame member arms are shaped and dimensioned such that when said locking element is in said coupling unlocking position said arm portions can be moved to disengage from said at least one recess of said insert portion to enable withdrawal of said insert portion from said sleeve portion.

15. A coupling according to claim 12, wherein said cross-piece comprises two generally U-shaped clips, each surrounding said free end of a respective shank, a free end portion of one arm of each of the clips being bent outwardly at right angles forming a support for said locking element.

16. A coupling according to claim 15, wherein a free end portion of the other arm of each of the clips is also bent outwardly at right angles and is provided with a bore for insertion of a safety pin.

17. A coupling according to claim 1, wherein said means defining at least one recess in the insert portion are formed by an annular groove extending about the periphery of the insert portion.

* * * * *